United States Patent [19]

Srock et al.

[11] Patent Number: 4,704,822
[45] Date of Patent: Nov. 10, 1987

[54] DOOR SYSTEM FOR MOTOR VEHICLES

[75] Inventors: Rainer Srock, Leonberg; Georg Eger, Hochdorf, both of Fed. Rep. of Germany

[73] Assignee: Dr. Ing.hcfPorsche Aktiengesellschaft, Stuttgart, Fed. Rep. of Germany

[21] Appl. No.: 920,455

[22] Filed: Oct. 20, 1986

[30] Foreign Application Priority Data

Oct. 19, 1985 [DE] Fed. Rep. of Germany ....... 3537303

[51] Int. Cl.4 ............................................. B60J 5/04
[52] U.S. Cl. ........................................ 49/502; 49/506
[58] Field of Search ................. 49/502, 501, 503, 506; 296/146

[56] References Cited

U.S. PATENT DOCUMENTS 4,416,088 11/1983 Feucht et al. ......................... 49/502
4,648,208 3/1987 Baldamus et al. ..................... 49/502
4,651,470 3/1987 Imura et al. ........................... 49/502

Primary Examiner—Philip C. Kannan

[57] ABSTRACT

The door system for a motor vehicle comprises essentially a basic frame and an interior and an exterior part of the door. Between these parts, installation aggregates are held at a cross member connected with the basic frame. A first door subassembly comprises a pre-assembled basic body consisting of carriers and column parts (door frame, cross member, hinge column, lock post, upper exterior door part, door shaft carrier); the individual parts of said basic body are connected with one another in a material-locking way. They form a one-piece carrying structure that is open to the interior and exterior side of the door for the mounting of installation aggregates located on the inside (window control mechanism, window). This carrying structure, via a second, detachably fastened subassembly consisting of an interior part of the door and a lower exterior part of the door, is enclosed in an encapsulating way on the exterior side and on the interior side. The interior part of the door consists of a plastic shell that is detachably connected with the lower exterior part of the door that also consists of plastic. The exterior part of the door is constructed to be divided in an approximately horizontal longitudinal plane, the upper exterior part of the door being an integrated undetachable component of the basic body, and the lower exterior part of the door being detachably fastened, via a holding device, at the upper exterior part of the door.

33 Claims, 8 Drawing Figures

DOOR SYSTEM FOR MOTOR VEHICLES

BACKGROUND AND SUMMARY OF THE INVENTION

This invention relates to a door arrangement including a basic frame having a cross member for receiving various installation parts and an interior and exterior door part for surrounding the frame.

Known vehicle doors consist of a one-piece interior wall and a one-piece exterior wall, said exterior wall in each case being undetachably connected with the body or frame of the door. The interior wall is equipped with assembly openings for inserting window control parts in the space between the interior and the exterior wall. These openings are relatively small so that the installation of the window control parts with the window is relatively time-consuming and labor-intensive. After the installation, the interior wall is also covered by a covering or similar means. Other known vehicle doors have assembly carriers (DE-OS No. 32 09 052) that are connected with window control parts outside the door and then in this assembled way are installed into the door. It is true that by means of this type of door construction the time-consuming and work-intensive mounting is avoided when the door is manufactured but in the case of a repair, costly fitting and stripping work is always required in order to repair and/or replace the window control and/or the window or other installed parts.

It is an object of the invention to provide a door arrangement that ensures simple mounting of installed assembly parts and has an automatically mountable and robot-weldable basic body that is of light weight and can be fitted into the door arrangement in a simple way and can also be removed in a simple way in the case of repairs.

According to the invention, this object is achieved by providing a pre-assembled door body or frame, a two piece exterior door part and an interior door part, whereby the interior door part and the bottom exterior door part form a single pre-assembled unit.

The main advantages achieved by means of the invention are that a basic door body is formed, the parts of which can be assembled by robot and can be connected with one another in a self-supporting way. By means of the monocoque construction of the individual parts forming the basic body as well as a targeted dimensioning of these parts, a light-weight door is provided that meets the indicated stability requirements with respect to torsion and bending. This basic door body forms a basic structure that is easily accessible from both sides for the mounting and dismounting of assembly parts within the door, such as the window control mechanism, the window and similar components. These parts can be installed in their final position without subsequent adjusting work, in which case the supplying and the fastening of these parts, because of the free accessibility to the mounting point, can take place by robot-operated mounting. Because of the arrangement of the interior part of the door that is complete with all parts, such as the armrest, the loudspeaker, and similar devices, and because of the arrangement of the exterior part of the door, it is relatively simple during repairs to replace the manual or motor-driven window control mechanism without having to carry out costly dismounting work, for example, the dismounting of the armrest or other components.

Also, in the case of damage to the lower exterior part of the door, an easy exchange of this door part is achieved permitting an easy and inexpensive replacement of parts during repair.

Since the interior part of the door and the lower exterior part of the door do not contribute significantly to the stability of the door, these parts may be dimensioned to the light-weight and in addition may be made of plastic.

An additional longitudinal reinforcement of the exterior parts of the door is achieved by means of a ram protection strip that is provided underneath a bordering between the two exterior parts. The reinforcement also secures against a lateral impact. For the visual covering of the bordering formed between both exterior parts of the door, an elastic strip is provided.

Other objects, advantages, and novel features of the present invention will become apparent from the following detailed description of the invention when considered in conjunction with the accompanying drawings.

DETAILED DESCRIPTION OF THE DRAWINGS

Figure 7:
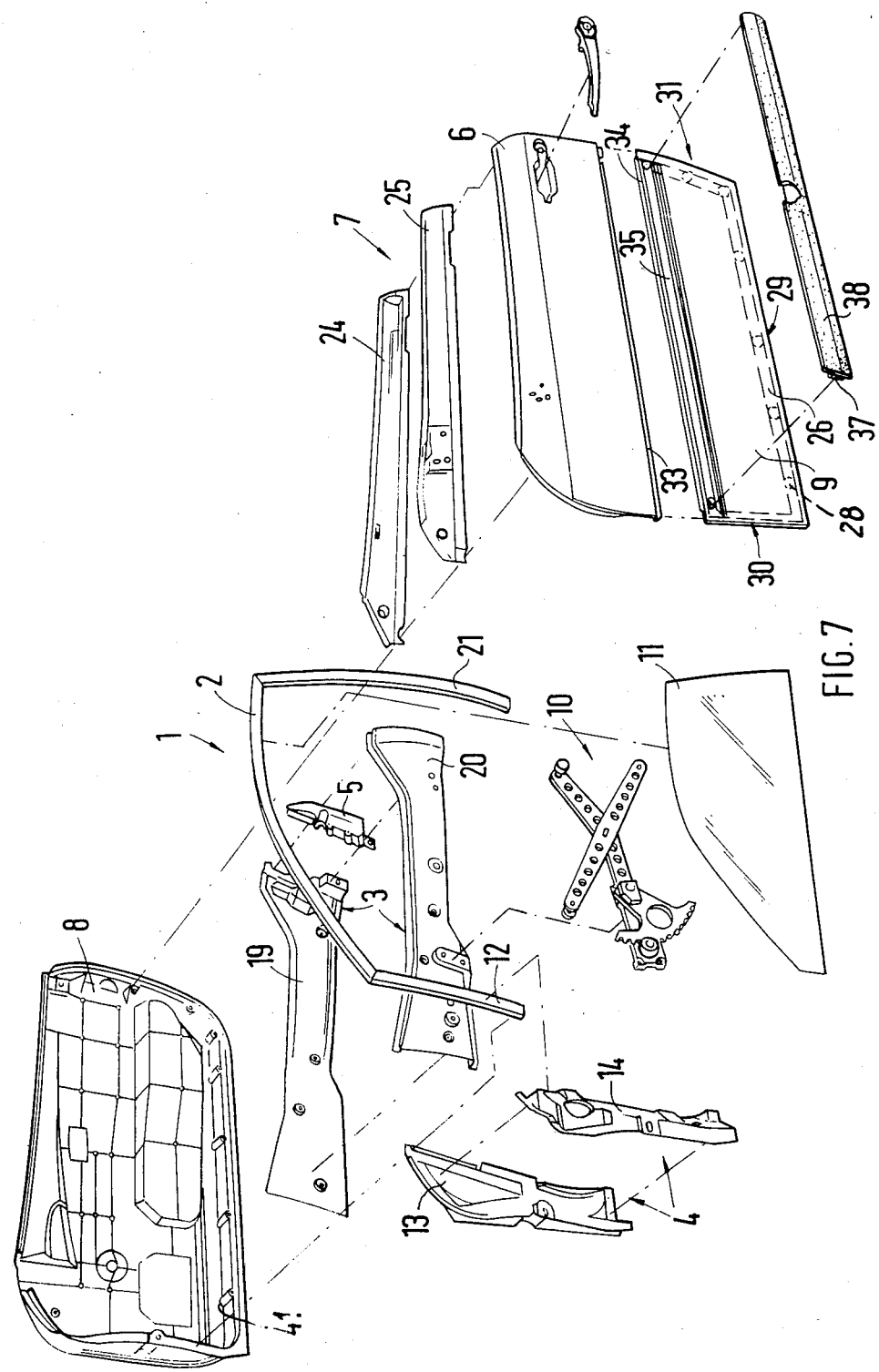
FIG. 7 is an exploded view of the door with its individual elements.

As shown in the exploded view in FIG. 7, the door system comprises essentially two subassemblies, in which case the first door subassembly comprises a basic body 1, the individual components of which are connected with one another in a self-supporting way. These individual components consist essentially of a door frame 2, a cross member 3, a hinge column 4, a lock post 5, an upper exterior part 6 of the door and a door shaft carrier 7. The second subassembly of the door comprises essentially an interior part 8 of the door and a lower exterior part 9 of the door that in a longitudinal plane X—X is separated from the upper exterior part 6 of the door. The connection of this second subassembly of the door with the first subassembly of the door takes place by means of a detachable fastening. Between the door parts 8, 6, and 9, at the cross member 3, a window control mechanism 10 is held and in it, a window 11.

Figure 1:
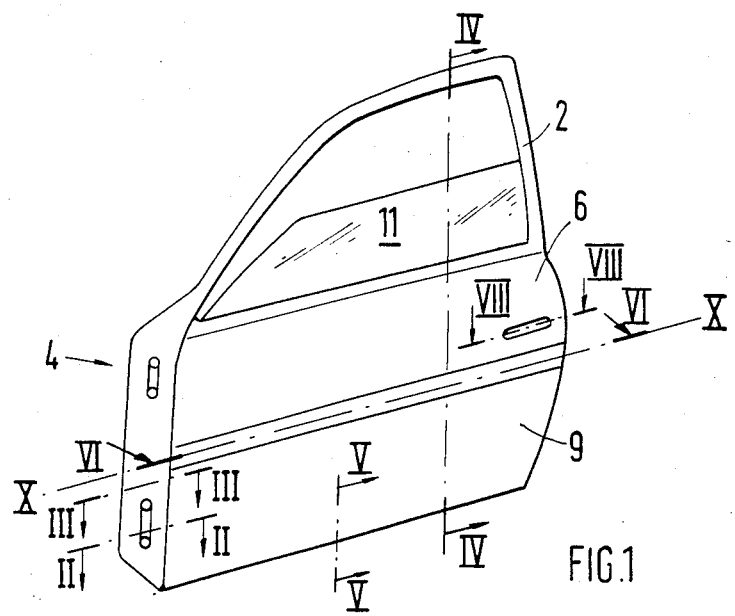
FIG. 1 is a front view of a diagrammatically represented door constructed in accordance with a preferred embodiment of the invention.
Figure 2:
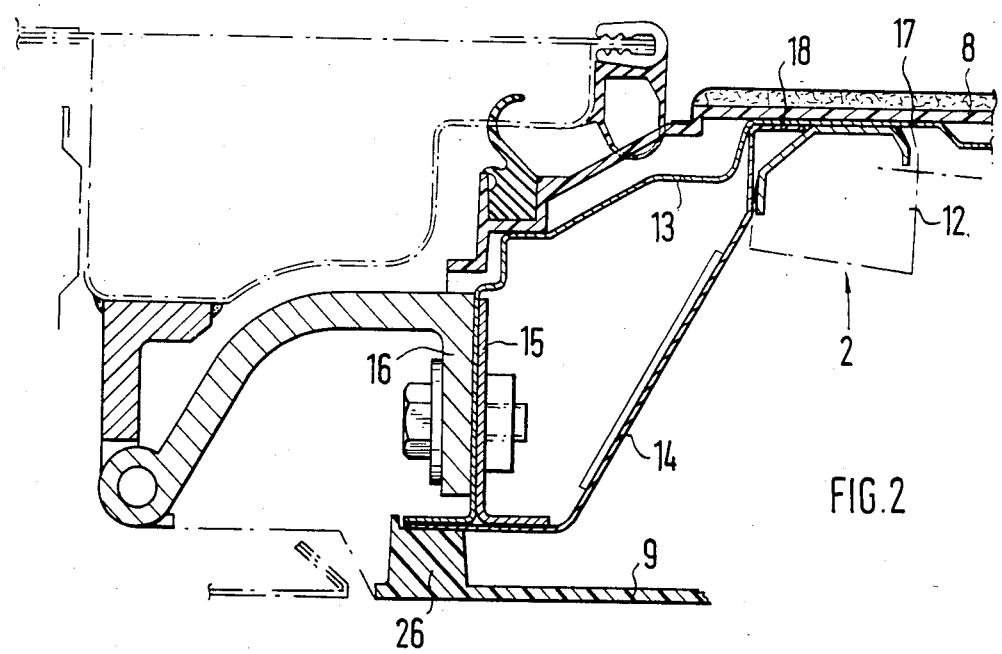
FIG. 2 is a horizontal section through the door in the hinge area taken along Line II—II of FIG. 1.
Figure 3:
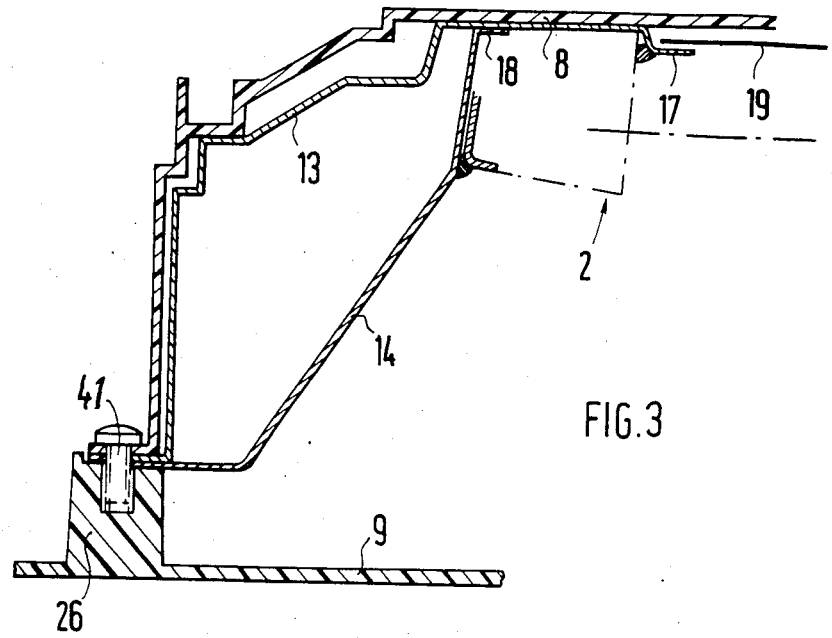
FIG. 3 a horizontal section through the door above the lower hinge taken along Line III—III of FIG. 1.
Figure 5:
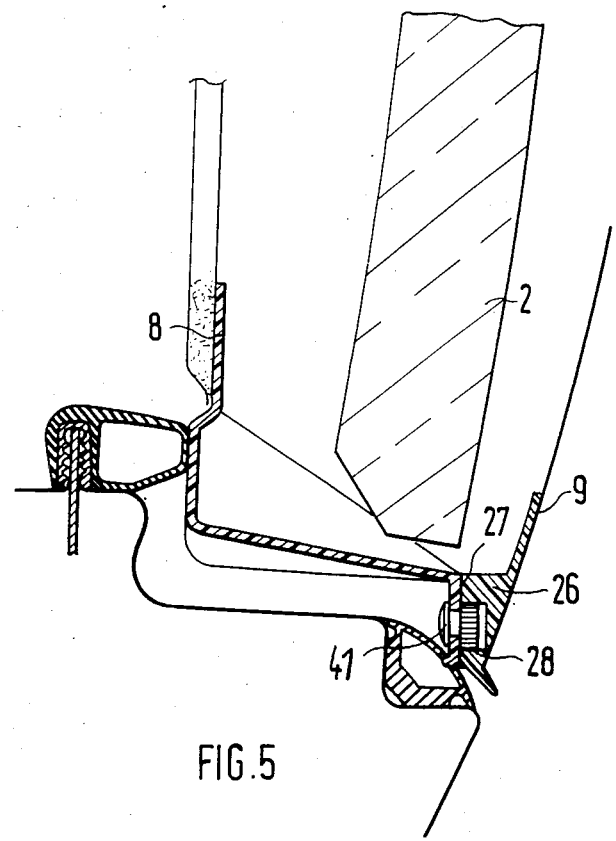
FIG. 5 is a vertical section through the door in the area of the lower edge of the door taken along Line V—V of FIG. 1.
Figure 6:
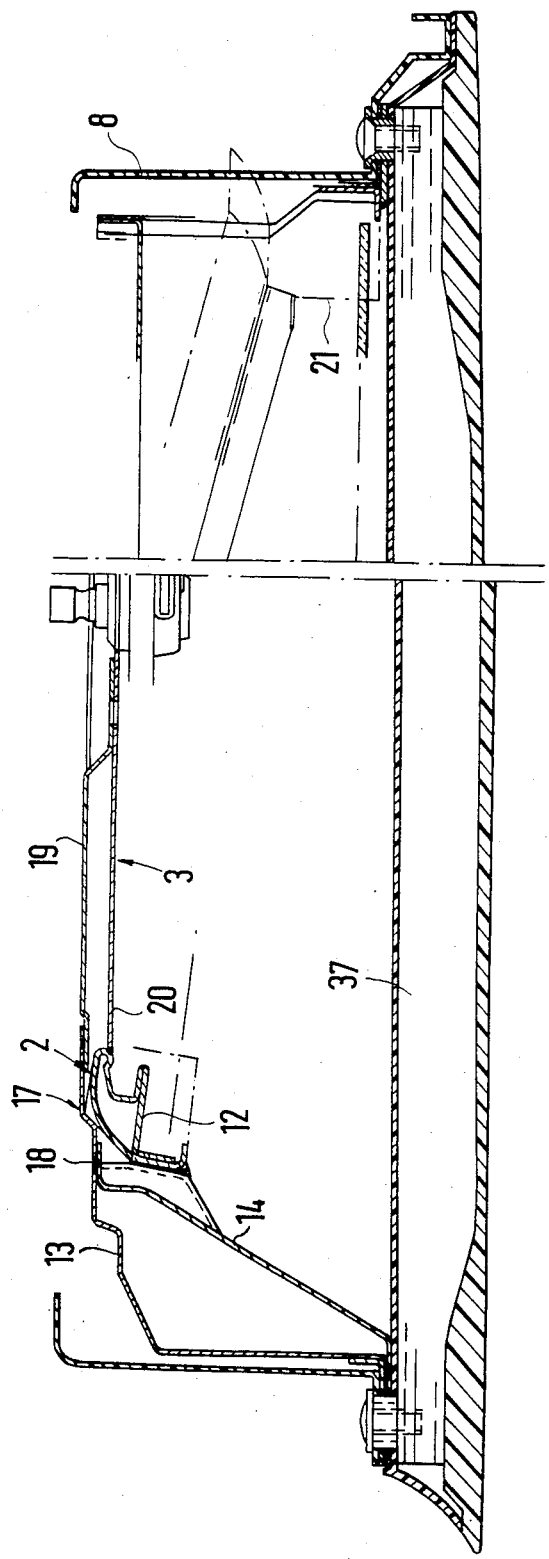
FIG. 6 is a horizontal section through the door in the area of the ram protection strip taken along Line VI—VI of FIG. 1.

The basic body 1 of the first subassembly of the door forms a stable carrying structure that is open toward the outside. It is composed of the door frame 2, at which the other individual components 3 to 7 of the door system are fastened. Thus, at the leg 12 of the door frame 2 that is located in front, a hinge column 4 is fastened that comprises two half shells 13 and 14 connected to form a box-section member. As shown in FIGS. 2 and 6, on the inside of the column 4, a reinforcement 15 for the holding of a hinge 16 is provided. As shown in FIG. 6, the holding leg 17 of the half shell 13 is led beyond its connecting point 18 at the half shell 14 located on the inside and is connected with an interior half shell 19 of the cross-member 3 as well as with the door frame 2, whereas the exterior half shell 20 of the cross member 3 is supported at both legs 12 and 21. The cross member 3 is used for receiving the window control mechanism 10.

Figure 8:
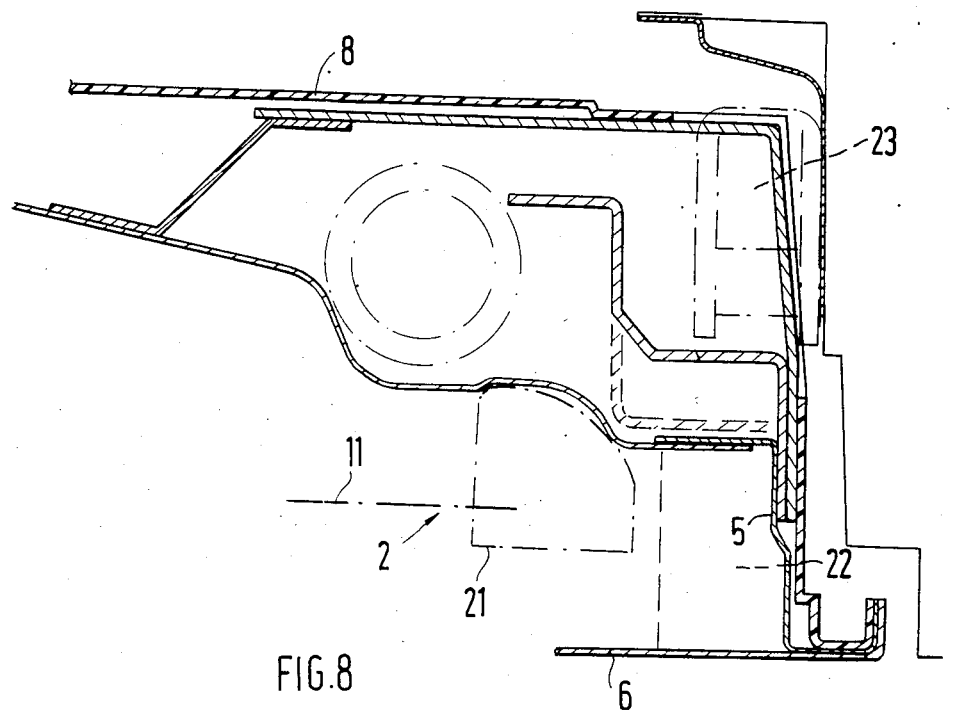
FIG. 8 is a horizontal section through the door in the area of the lock according to Line VIII—VIII of FIG. 1.

The lock post 5 (FIGS. 7 and 8) is also connected with the leg 21 of the door frame 2 and the interior half shell 19 of the cross member. A lock cylinder 22 (FIG. 8) is held between the upper exterior part 6 of the door and the lock post 5 that is constructed as one shell. A key collar 35 of the lock is outlined in FIG. 4.

After these individual components, such as the hinge column 4, the lock post 5 and the cross member 3 are connected with the door frame 2 in a self-supporting way, the door shaft carrier 7 is joined to the upper exterior part 6 of the door. This door shaft carrier 7 consists essentially of two half shells 24 and 25 that are connected with one another, in which case the exterior half shell 25 is glued flatly to the interior side of the upper exterior part 6 of the door. This exterior part 6 of the door as well as the door shaft carrier 7, at the end sides, are also in a self-supporting manner connected with the door frame 2 and form a one-piece structural unit with it and the other individual parts 3 to 5 of the door. The structural unit is accessible from both sides so that a mounting of subassemblies located in the door, such as the window control mechanism 10, becomes possible in a simple way.

After the installation of these aggregate parts, the door is, in an encapsulating way, enclosed by the second subassembly jointly by the interior part 8 of the door and the lower exterior part 9 of the door. The interior part 8 of the door consists preferably of a plastic shell and, via screw means, is detachably connected with the lower exterior part 9 of the door that also consists of plastic. For this purpose, as shown in FIG. 7, the lower exterior part 9 of the door has a molded-on shoulder 26 that forms a surrounding contact surface 27 for the interior part 8 of the door and that has fastening nuts 28 or similar means for the fixing of the screws 41. A sealing means may also be provided in the shoulder 26. In particular, the shoulder 26 is provided in a horizontal fastening section 29 and vertical fastening sections 30 and 31 which is shown in detail in FIG. 7.

Figure 4:
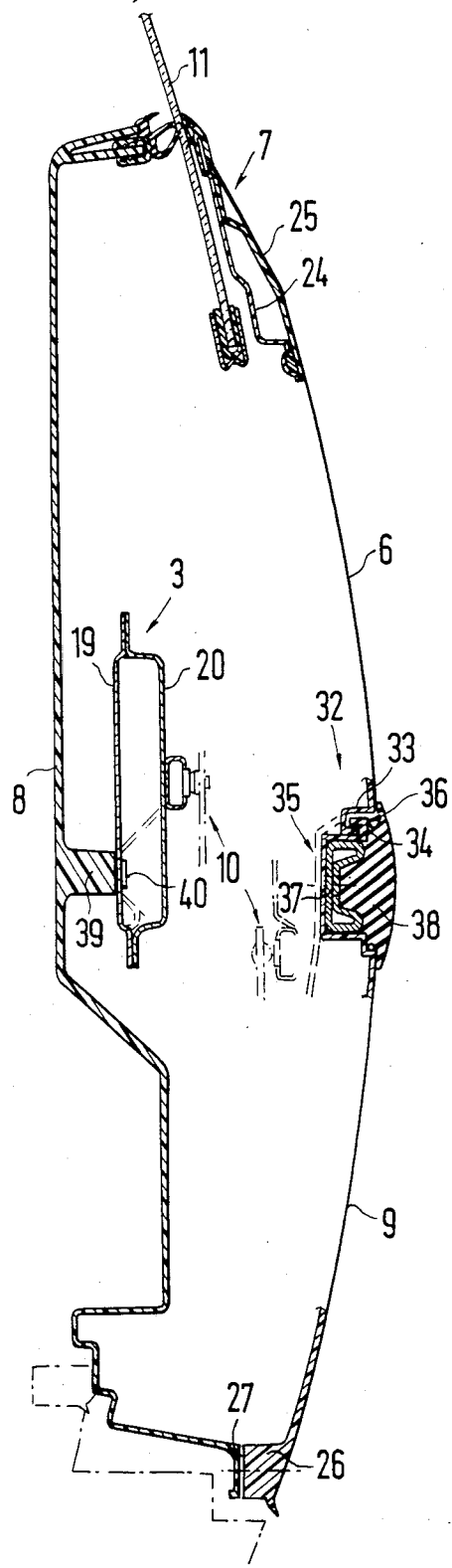
FIG. 4 is a vertical section through the door taken along Line IV—IV of FIG. 1.

The lower detachable exterior part 9 of the door is constructed so that it is divided from the firmly connected upper exterior part 6 of the door approximately in the area of the largest width of the vehicle, in longitudinal direction. Via a holding arrangement 32 that consists of two engaging U-profile-shaped connecting strips 33, 34, a quasi form-fitting connection is created. Between these strips, an elastic sealing means, for example, of rubber or a similar substance, may be arranged. Below this holding arrangement 32, connecting directly to the connecting strip 34, a groove 35 is provided that is displaced toward the inside. In the groove, a ram protection strip 37 is held that consists of a carrier that is resistant to bending and that toward the outside is covered by an elastic strip 38. This strip 38 extends beyond the bordering 36 of the two exterior parts 6 and 9 of the door (FIG. 4). The ram protection strip 37, in each case of the end side, is screwed to the door parts 8 and 9 and supports itself at the basic body of the door.

At the level of the cross member 3, the interior part 8 of the door has spacer cams 39 in which screws 40 for the fixing of the interior part 8 of the door are fastened that are screwed through the half shell 19 of the cross member 3.

The components of the first subassembly of the door are preferably constructed in such a way and have such welding points that a robot mounting and robot welding becomes possible. Thus, the two-shell components, such as the hinge column 4, the cross member 3 and the door shaft carrier 7, as well as the upper exterior part 6 of the door and the lock post 5, are connected first, in a self-supporting way, with the door frame 2. By means of the interior and exterior opening of the door that is laterally bordered by the vertical legs 12 and 21 of the door frame 2, the installation aggregates (window control mechanism 10, window 11) can be mounted at the cross member 3. The completed interior part 8 of the door is connected with the lower exterior part 9 of the door and built together with the supplement of the ram portection strip 37.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A door system for a motor vehicle that comprises essentially a basic frame with an interior part and an exterior part of the door, between which, at a cross member connected with the basic frame, installation aggregates are held, the door parts being constructed for receiving hinges and a lock, characterized by a first subassembly of the door that comprises a preassembled basic body consisting of carriers and column parts, the individual parts of said basic body being connected with one another in a self-supporting way and forming an open one-piece bearing structure that is open to the interior and exterior side of the door for the mounting of installed aggregate parts located on the inside, and wherein this bearing structure, by means of a second detachably fastened subassembly that consists of an interior part of the door and a lower exterior part of the door is enclosed in an encapsulating way on the exterior and on the interior side.

2. A door system according to claim 1, wherein the interior part of the door consists of a plastic shell that is detachably connected via screw means with the lower exterior part of the door in the area of a lower horizontal fastening section and other vertically extending fastening sections.

3. A door system according to claim 2, wherein the exterior part of the door is constructed to be divided in an approximately horizontal longitudinal plane, the upper exterior part of the door being an integrated undetachable component of the basic body and the lower exterior part of the door, via a holding mechanism, being detachably fastened at the upper exterior part of the door.

4. A door system according to claim 3, wherein the lower exterior part of the door consists of plastic and has a molded-on shoulder that forms a surrounding contact surface for the interior part of the door and is developed for receiving fastening nuts.

5. A door system according to claims 3, wherein the lower exterior part of the door and the upper exterior part of the door at their bordering extending in longitudinal direction have the holding mechanism that consists of engaging U-profile-shaped connection strips.

6. A door system according to claim 5, wherein the lower exterior part of the door, in the area of the largest width of the vehicle, has the connecting strips as well as an adjacently arranged longitudinally extending groove displaced toward the inside in which a ram protection strip is held that on the exterior side, is connected with an elastic strip.

7. A door system according to claim 6, wherein the elastic strip has a dimension covering the border between both exterior parts of the door.

8. A door system according to claim 7, wherein the ram protection strip comprises a carrier that is resistant to bending and supports itself at the end side at the bearing structure and is fastened together with the interior and exterior part of the door.

9. A door system according to claim 1, wherein the U-shaped door frame of the first subassembly, at one of its legs, is connected with the hinge column and, at its other leg, is connected with the lock post, and between these two columns or posts, the cross member for receiving the installation aggregate parts is held at the door frame as well as at the hinge column and at the lock post.

10. A door system according to claim 9, wherein the hinge column comprises two half shells that are connected with one another in a self-supporting manner and form a box-section member having a holding leg that is led beyond the connecting point at the interior half shell.

11. A door system according to claim 10, wherein the cross member consists of two half shells that are connected with one another, the interior half shell being connected with the extended holding leg of one part of the hinge column, and the exterior half shell being fastened at the legs of the door frame.

12. A door system according to claim 11, wherein the interior part of the door, at its interior side, has spacing cams that are arranged resting at the interior half shell of the cross member, and the cams receive a screw held at the half shell for the fastening of the interior part of the door at the cross member.

13. A door system according to claim 12, wherein the two-shell door shaft carrier, in a self-locking way, is connected with the upper exterior part of the door, the exterior carrier being glued to the upper exterior part of the door.

14. A process for manufacturing a motor vehicle door, comprising (a) connecting two-shell components, such as a hinge column, a cross member, a door shaft carrier as well as an upper single-shell exterior part of a door and a lock post to a frame in a self-locking manner to form a basic body means, and (b) mounting installation aggregates (window control mechanism, window) at the cross member through an interior and exterior opening of the door that is laterally bordered by the vertical legs of a door frame, (c) connecting the completed interior part of the door together with the lower exterior part of the door and (d) attaching the pre-assembled interior part and lower exterior part to the basic body means including arranging a ram protection strip at the connection between the lower exterior part and the upper exterior part.

15. A door arrangement for a motor vehicle, comprising:
an interior door part for the interior of the motor vehicle,
upper and lower exterior door parts for the exterior of the motor vehicle, said interior door part and said lower exterior door part forming a single pre-assembled door assembly,
a door body means including a door frame means, the upper exterior door part and a cross member for carrying door assembly parts, said door body means being pre-assembled and being open and accessible toward the interior and exterior of the motor vehicle,
and connecting means for detachably connecting the door assembly to the door body means so that the door assembly partially surrounds the door body means.

16. A door arrangement according to claim 15, wherein screw means detachably connects the interior door part and the lower exterior door part forming the single pre-assembled door assembly.

17. A door arrangement according to claim 16, wherein the lower exterior door part and the interior door part are made of plastic material.

18. A door arrangement according to claim 15, wherein the door body means further includes a hinge column, a lock post, and a door shaft carrier.

19. A door arrangement according to claim 18, wherein the door assembly parts include a window and a window control mechanism.

20. A door arrangement according to claim 19, wherein said connecting means includes a holding means for holding together the lower exterior door part and the upper exterior door part of the body means.

21. A door arrangement according to claim 20, wherein said holding means includes interlocking U-profile shaped connecting strips,
and wherein a U-profile shaped connecting strip is fixedly attached to each of the upper and lower door parts.

22. A door arrangement according to claim 21, wherein a groove is formed in the lower exterior door part adjacent the interlocking U-profile shaped connecting strips, and wherein a rigid protection strip is arranged in the groove, said rigid protection strip being covered by an elastic strip.

23. A door arrangement according to claim 22, wherein the elastic strip covers the connecting area where the U-profile shaped connection strips interlock.

24. A door arrangement according to claim 22, wherein the rigid protection strip is fastened at the groove to the lower exterior door part and the interior door part.

25. A door arrangement according to claim 24, wherein an elastic sealing means is arranged between the interlocking U-profile shaped connecting strips.

26. A door arrangement according to claim 25, wherein the connecting means further includes attaching means for attaching the interior door part to the body means.

27. A door arrangement according to claim 26, wherein the attaching means attaches the interior door part to the cross member of the body means.

28. A door arrangement according to claim 27, wherein the attaching means is a screw means.

29. A door arrangement according to claim 26, wherein the frame is U-shaped and includes frame legs and wherein the cross member connects the frame legs.

30. A door arrangement according to claim 29, wherein the cross member includes interior and exterior shells.

31. A door arrangement according to claim 30, wherein the hinge column comprises two half shells that are connected in a self-supporting manner, said shells forming a holding leg.

32. A door arrangement according to claim 31, wherein the interior shell of the cross member is connected with the extended holding leg on the hinge column and the exterior shell is fastened at tne legs at the door frame.

33. A method of manufacturing a door arrangement for a motor vehicle, comprising:
- pre-assembling a first subassembly, including a door frame, an upper exterior door part, and cross member for carrying door assembly parts;
- pre-assembling a second subassembly, including an interior door part and a bottom exterior door part; and
- fixing the second subassembly to the first subassembly.

* * * * *